United States Patent Office 3,031,515
Patented Apr. 24, 1962

3,031,515
PROCESS FOR PURIFYING ISOPRENES
Andre C. Deprez, Paris, France, and John White Colton, Pelham Manor, N.Y., assignors to Scientific Design Company, Inc., a corporation of Delaware
No Drawing. Filed Dec. 18, 1959, Ser. No. 860,351
12 Claims. (Cl. 260—681.5)

This invention relates to improvements in the recovery and purification of isoprene, and more particularly concerns an improved process for refining isoprene from mixtures comprising isoprene and organic contaminants.

It is known in the art that isoprene may be prepared by a variety of methods in which organic contaminants must be separated by means such as distillation in order to obtain a purified isoprene product. In one method described in copending application, Ser. No. 669,903, filed December 2, 1957, propylene is dimerized to form hexenes which can be "cracked" to yield isoprene. In this method the light hydrocarbon by-products may be removed by ordinary fractionation but it has been found that utilization of such ordinary fractionation is insufficient to remove certain contaminants boiling in the range close to isoprene and results in yields which in some cases are of unsatisfactory quality. Such contaminants comprise pentenes, hexenes, and other unsaturated hydrocarbons, particularly 4-methyl pentene-1 and cis-4-methyl pentene-2. The separation of isoprene from these contaminants is extremely difficult and requires extensive distillation. In some instances a reflux to product ratio of at least 20 to 1 is required and even then the substantial elimination of these contaminants is not insured.

It is therefore an important object of the present invention to provide an improved process for recovering from a mixture of isoprene and undesirable organic compounds, a substantially pure isoprene product.

Another object of the invention is to provide an improved process for the separation and recovery of isoprene from a mixture comprising isoprene, 4-methyl pentene-1, and cis-4-methyl pentene-2.

Another object of the present invention is to provide a simple and economical process for the recovery of isoprene from a mixture of organic compounds comprising extractively distilling the mixture utilizing a solvent selected from the class consisting of dibenzyl ether, n-tricresyl phosphate, di-n-hexyl sebacate, di-isodecyl phthalate and dibutyl phthalate.

Another object of the invention is to provide an improved method of separating high purity isoprene from a mixture obtained from the cracking of propylene dimer comprising the combination of azeotropically distilling the mixture to remove a major portion of the contained impurities and extractively distilling the mixture to remove remaining impurities.

Other objects, features, and advantages of the present invention will be apparent from the following detailed description of a preferred embodiment.

In accordance with the invention, there is provided a novel process for producing high purity isoprene from a mixture comprising isoprene and unsaturated hydrocarbons which comprises the step of extractively distilling the mixture utilizing an extractive distillation solvent selected from the class consisting of dibenzyl ether, n-tricresyl phosphate, di-n-hexyl sebacate, di-isodecyl phthalate, and dibutyl phthalate.

A preferred method of practicing the invention comprises the combination of steps of preliminarily distilling the isoprene mixture, utilizing a suitable azeotroping agent such as acetone or preferably acetonitrile to remove a major portion of the contained by-products, and extractively distilling the resulting mixture, utilizing a suitable extractive distillation solvent selected from the class consisting of dibenzyl ether, n-tricresyl phosphate, di-n-hexyl sebacate, di-isodecyl phthalate, and dibutyl phthalate to remove the remaining portion of the contained by-product.

For convenience, the invention will be described in connection with the separation and recovery of isoprene from a mixture obtained from the cracking of propylene dimer, utilizing as the initial distillation solvent, acetonitrile, and as the extractive distillation solvent, di-benzyl eher. However, it is to be understood that the principles of the invention are susceptible of use in the recovery of isoprene from other isoprene containing mixtures utilizing other distillation solvents.

Preferably, the method of invention comprises admixing an azeotroping agent such as an acetonitrile solution with a mixture comprising isoprene and by-products obtained from the cracking of hexenes, azeotropically distilling acetonitrile along with a major portion of the by-products from said admixture to provide a remaining isoprene-rich mixture as a bottom effluent, preparing the isoprene-rich mixture for extractive distillation by washing the remaining isoprene-rich mixture with water for example, to remove traces of acetonitrile, and drying the so-treated isoprene-rich mixture by azeotropic distillation, and extractively distilling isoprene from the dry, isoprene rich mixture utilizing an extractive distillation solvent, such as dibenzyl ether, to produce an overhead of substantially pure isoprene.

In order to indicate still more fully the nature of the present invention, the following examples of typical procedures are set forth in which parts and percent mean part and percent by weight, unless otherwise indicated, it being understood that these examples are presented as illusrative only and that they are not intended to limit the scope of the invention.

*Example 1*

An isoprene mixture of approximately 98.0% isoprene and 2.0% organic contaminants is charged into the pot of a packed glass distillation column where it is batch distilled and condensed. The condensate is returned to the column as reflux, the reflux to product ratio being 25:1. The sections of packing, totalling 8 feet, are estimated to be the equivalent of 96 theoretical trays. The product overhead is isolated into 8 separate cuts in order to remove the lower boiling contaminants in the first few cuts and to leave the heavier contaminants in the residue left in the pot. No temperature change is noted during the course of the fractionation, the temperature above the packing remaining constant at 34° C. The overhead isoprene product is found to contain 98.8% isoprene with the remainder comprising organic by-products.

*Example 2*

An isoprene mixture identical to the one utilized in Example 1 is fed into an extractive distillation column having three zones of packing totalling 8 feet and separated by two vertically spaced feed points. 100 parts by weight per hour of isoprene mixture are fed continuously to the lower feed point. Dibenzyl ether is fed into the column at the upper feed point at the rate of approximately 300 parts per hour. The lower two packed zones are each approximately 3 feet long and are estimated to be the equivalent of 36 theoretical trays each. The boil-up rate of isoprene mixture and dibenzyl ether after initial stabilization is set at about 10 mols per hour. The uppermost zone is approximately 2 feet long and serves to separate isoprene from traces of the dibenzyl ether solvent vapor. The reflux to product rate is changed frequently during the initial, unsteady part of the distillation in order to establish an isoprene product draw-off rate of approximately 80 parts per hour. Isoprene product is collected overhead and found to be substantially free of all by-products.

A comparison of Examples 1 and 2 demonstrates that utilization of dibenzyl ether as a solvent in the extractive distillation of isoprene results in an isoprene product substantially free of contaminants.

Example 3

Example 2 is repeated, substituting n-tricresyl phosphate for dibenzyl ether. Substantially similar results are obtained.

Example 4

Example 2 is repeated, substituting di-n-hexyl sebacate for dibenzyl ether. Substantially similar results are obtained.

Example 5

Example 2 is repeated substituting di-isodecyl phthalate for dibenzyl ether. Substantially similar results are obtained.

Example 6

Example 2 is repeated substituting dibutyl phthalate for dibenzyl ether. Substantially similar results are obtained.

It will be appreciated that in the above examples, the ratio of dibenzyl ether to isoprene in the extractive distillation mixture can be broadly 200 to 0.01, desirably 50 to 0.1, and preferably 5 to 1.

The diameter of the column is dependent on the quantity of the isoprene to be purified and is fixed by the desired flow rate of dibenzyl ether through the column.

The height of the column is dependent upon the degree of separation required. The operation can be carried out in a standard plate distillation column or in a packed column. Any standard packing media such as Raschig rings or Berl saddles can be employed.

The purification methods described herein are particularly useful where isoprene is prepared from a hydrocarbon at high temperatures, in which isoprene is obtained by cracking or demethanation either thermally or catalytically, and there are produced hydrocarbon by-products.

It will be understood that modifications and variations may be effected without departing from the spirit and scope of the invention.

What is claimed is:

1. A process for recovering isoprene from an isoprene containing mixture obtained from the cracking of propylene dimer comprising extractively distilling the mixture utilizing an extractive distillation solvent selected from the class consisting of dibenzyl ether, n-tricresyl phosphate, di-n-hexyl sebacate, di-isodecyl phthalate, and dibutyl phthalate, and removing substantially pure isoprene distillate.

2. A process for recovering isoprene from an isoprene containing mixture obtained from the cracking of propylene dimer comprising extractively distilling the mixture utilizing as an extractive distillation solvent, dibenzyl ether, and removing substantially pure isoprene distillate.

3. A process for recovering isoprene from an isoprene containing mixture obtained from the cracking of propylene dimer comprising extractively distilling the mixture utilizing as an extractive distillation solvent, n-tricresyl phosphate, and removing substantially pure isoprene distillate.

4. A process for recovering isoprene from an isoprene containing mixture obtained from the cracking of propylene dimer comprising extractively distilling the mixture utilizing as an extractive distillation solvent, di-n-hexyl sebacate, and removing substantially pure isoprene distillate.

5. A process for recovering isoprene from an isoprene containing mixture obtained from the cracking of propylene dimer comprising extractively distilling the mixture utilizing as an extractive distillation solvent, di-isodecyl phthalate, and removing substantially pure isoprene distillate.

6. A process for recovering isoprene from an isoprene containing mixture obtained from the cracking of propylene dimer comprising extractively distilling the mixture utilizing as an extractive distillation solvent, dibutyl phthalate, and removing substantially pure isoprene distillate.

7. A process for recovering isoprene from an isoprene containing mixture obtained from the cracking of propylene dimer comprising the combination of azeotropically distilling the mixture to remove a major portion of the contained impurities and extractively distilling the mixture utilizing an extractive distillation solvent selected from the class consisting of dibenzyl ether, n-tricresyl phosphate, di-n-hexyl sebacate, di-isodecyl phthalate, and dibutyl phthalate, and removing substantially pure isoprene distillate.

8. A process for recovering isoprene from an isoprene containing mixture obtained from the cracking of propylene dimer comprising the combination of azeotropically distilling the mixture to remove a major portion of the contained impurities and extractively distilling the mixture utilizing as an extractive distillation solvent, dibenzyl ether, and removing substantially pure isoprene distillate.

9. A process for recovering isoprene from an isoprene containing mixture obtained from the cracking of propylene dimer comprising the combination of azeotropically distilling the mixture to remove a major portion of the contained impurities and extractively distilling the mixture utilizing as an extractive distillation solvent, n-tricresyl phosphate, and removing substantially pure isoprene distillate.

10. A process for recovering isoprene from an isoprene containing mixture obtained from the cracking of propylene dimer comprising the combination of azeotropically distilling the mixture to remove a major portion of the contained impurities and extractively distilling the mixture utilizing as an extractive distillation solvent, di-n-hexyl sebacate, and removing substantially pure isoprene distillate.

11. A process for recovering isoprene from an isoprene containing mixture obtained from the cracking of propylene dimer comprising the combination of azeotropically distilling the mixture to remove a major portion of the contained impurities and extractively distilling the mixture utilizing as an extractive distillation solvent, di-isodecyl phthalate, and removing substantially pure isoprene distillate.

12. A process for recovering isoprene from an isoprene containing mixture obtained from the cracking of propylene dimer comprising the combination of azeotropically distilling the mixture to remove a major portion of the contained impurities and extractively distilling the mixture utilizing as an extractive distillation solvent, dibutyl phthalate, and removing substantially pure isoprene distillate.

References Cited in the file of this patent

UNITED STATES PATENTS

| | | |
|---|---|---|
| 2,243,873 | Lyman | June 3, 1941 |
| 2,339,560 | DeSimo et al. | Jan. 18, 1944 |
| 2,404,056 | Gorin et al. | July 16, 1946 |
| 2,407,820 | Durrum | Sept. 17, 1946 |